P. LOME.
PNEUMATIC TIRE PROTECTOR.
APPLICATION FILED NOV. 9, 1921.

1,417,755.   Patented May 30, 1922.

Witnesses:

Inventor
Philip Lome
His Attorney

UNITED STATES PATENT OFFICE.

PHILIP LOME, OF CHICAGO, ILLINOIS.

PNEUMATIC-TIRE PROTECTOR.

1,417,755.  Specification of Letters Patent. Patented May 30, 1922.

Application filed November 9, 1921. Serial No. 513,897.

*To all whom it may concern:*

Be it known that I, PHILIP LOME, a citizen of the United States, and a resident of the city of Chicago, county of Cook, and State of Illinois, have invented certain new and useful Improvements in Pneumatic-Tire Protectors, of which the following is a specification.

This invention relates to pneumatic tire protectors and has for its object the provision of an outer tread strip adapted to be easily and quickly secured to the periphery of a tire to prevent wear thereon, and which is provided with reinforcing means for protecting the sides of said tread strip from injury in use.

Another object of the invention is to provide a plurality of metal cups on the outer surface of said tread strip, each of said cups being provided with a cushioning member of resilient material adapted to cushion the impact of said cups on the pavement, and which is so constructed that the cushioning member and cup will wear equally without rendering the cushioning means inoperative.

Other objects will appear hereinafter.

The invention consists in the combinations and arrangements of parts hereinafter described and claimed.

The invention will be best understood by reference to the accompanying drawings forming a part of this specification, and in which, Fig. 1 is a side elevation of a segment of a pneumatic tire showing my invention in position thereon.

Figure 1:
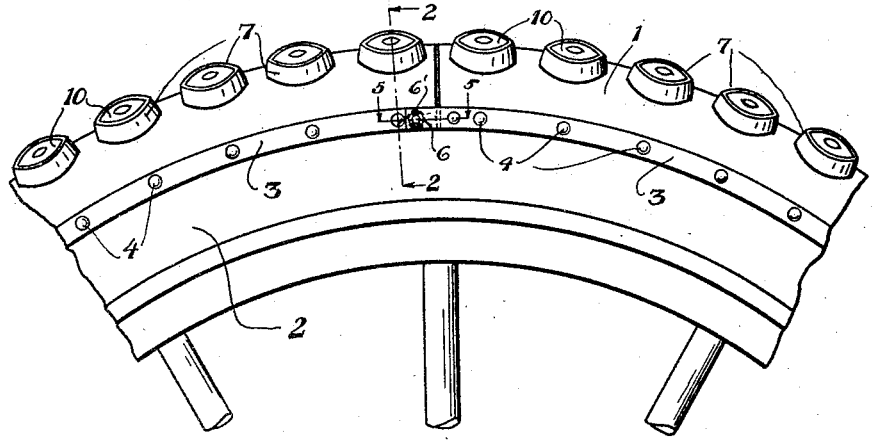
Figure 5:
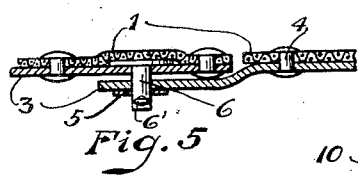
Fig. 5 is a sectional detail view of the lock for securing a tread strip on the tire.

As shown in the drawings the tread strip 1 is adapted to be disposed about the outer periphery of a tire 2, and preferably held in position thereon by means of flat metal split rings 3 fastened to the opposite edges of the strip 1 by means of rivets 4, the circumference of the rings 3 being less than the outer periphery of the tire 2.

Any suitable means may be provided for securing the ends of the rings 3 together to hold the tread strip in position on the tire. As shown, I provide one end of each of the rings 3 with an eye 5, adapted to be slipped over studs 6 provided on opposite ends of such rings, each stud 6 being suitably bored to receive a cotter pin 6′. I preferably employ continuous split rings as described, but if deemed necessary in order to facilitate application of the tread strip, the tread strip 1 may consist of two sections having half rings secured to the edges thereof, said rings being adapted to have their ends fastened together in the same manner as above described.

Figure 2:
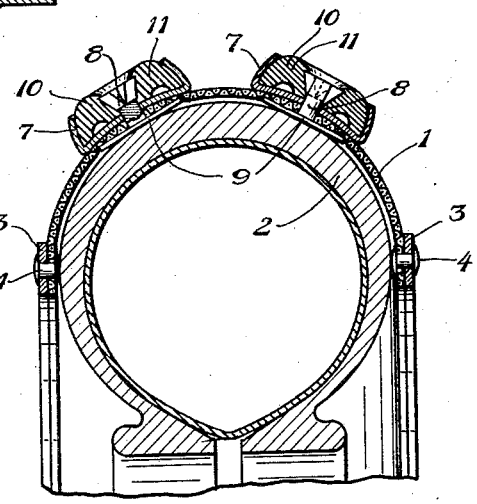
Fig. 2 is a sectional view on the line 2—2 of Fig. 1.
Figure 3:
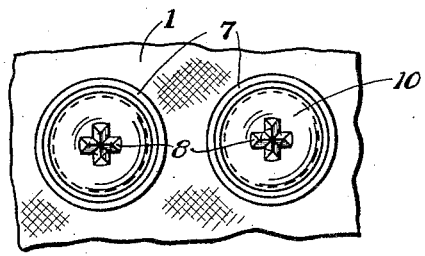
Fig. 3 is a top plan view of a fragment of the tread strip showing wear cups fastened thereon.
Figure 4:
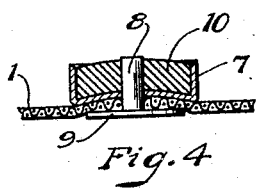
Fig. 4 is a sectional view of a wear cup before same has been altered in accordance with my invention.

On the periphery of the tread strip 1 I preferably position rows of wear cups 7, which are held in position thereon by means of rivets 8. Each of the rivets 8 has a large flat head 9 adapted to receive a large bearing surface when engaging the tire 2. If desired, a strip of suitable material may be interposed between the tire and the tread strip to prevent direct contact of the rivet heads 9 with the surface of the tire. The stem of the rivet 8 extends through the tread strip 1 and projects into the cup 7 as shown in Fig. 2. Each of the cups 7 is provided with a washer 10 of rubber or other resilient material, whose circumference is preferably larger than the inner circumference of said cup. Said washer is perforated at its central point by the stem of the rivet 8 and held in position in the cup by mushrooming the end of the rivet 8 as best shown in Fig. 3. The washer 10 is compressed between the inwardly curved side walls of the cup 7 which causes same to bulge outwardly as at 11 beyond the edges of the cup and the head of the rivet, leaving a space 12 beneath the rubber washer as shown in Fig. 2.

By this arrangement it will be understood that the bulging portion of the rubber washer will initially engage the ground when the tread strip is in use thereby obviating "clacking" of the plates on the roadway and providing an anti-skid element. Due to the peculiar construction of the cup and the manner in which the rubber washer is retained therein, the cup and washer will wear equally without destroying the resilient properties of the washer, and such washer will continue to project beyond the edges of the cup notwithstanding wear thereon.

The invention provides a cheap and easily applied tread strip having cushioned metal cups mounted thereon, which protects the tire and increases the wearing quality thereof. The metal cups mounted on the strip provide anti-skid and traction elements and the cushion member imbedded in each cup wears equally with the cup, remains operative until the cup is entirely worn out.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention, what I claim as new and desire to secure by Letters Patent is:

1. In a device of the character described comprising a tire tread strip; a wear cup mounted on said tread strip; and means for compressing a cushioning member in said wear cup whereby same is caused to bulge outwardly from the bottom of said cup and outwardly beyond the edges of said cup.

2. In a device of the character described comprising a tire tread strip; a wear cup mounted on said tread strip; and means for compressing a cushioning member in said wear cup whereby same is caused to bulge outwardly beyond the edges of said cup.

3. In a device of the character described comprising a tire tread strip; a wear cup mounted on said tread strip; and means for compressing a cushioning member in said wear cup, whereby an air chamber is formed beneath same.

4. In a device of the character described comprising a tire tread strip; a wear cup mounted on said tread strip, and having a resilient washer of larger circumference than said cup disposed therein; means for fastening the central point of said washer in said cup; and means for compressing the edges of said washer to cause same to bulge beyond the edges of said cup and said retaining means.

5. In a device of the character described comprising a tire tread strip; a wear cup mounted on said strip; a resilient washer of larger circumference than said cup disposed therein; means for retaining the central portion of said washer in said cup; and inwardly curved sides on said cup compressing the edges of said washer and causing same to bulge beyond the edges of the cup and upwardly from the bottom of said cup, whereby said washer will continue to bulge notwithstanding wear on said washer and said cup.

6. In a device of the character described comprising a tire tread strip; a wear cup disposed on said strip; a washer of larger circumference than said cup disposed therein; a rivet passing through said tread strip and said washer and having its head mushroomed to hold said washer in said cup and said cup to said strip, said cup having inwardly curved edges for compressing said washer to cause it to bulge outwardly, whereby same will continue to bulge outwardly despite wear thereon and on the edges of said cup.

In testimony whereof I have signed my name to this specification in the presence of two subscribing witnesses.

PHILIP LOME.

Witnesses:
JOSHUA R. H. POTTS,
FREDA C. APPLETON.